(12) United States Patent
Curran et al.

(10) Patent No.: US 10,315,235 B2
(45) Date of Patent: Jun. 11, 2019

(54) CIP WASH COMPARISON AND SIMULATION

(71) Applicant: Ecolab USA Inc., St. Paul, MN (US)

(72) Inventors: Joseph P. Curran, Mahtomedi, MN (US); Finn Jensen, Arden (DK); Jonathan Kingsbury, Apple Valley, MN (US); Paul Schacht, Oakdale, MN (US); Juli Young, Farmington, MN (US); James Krohn, Oakdale, MN (US)

(73) Assignee: Ecolab USA Inc., Saint Paul, MN (US)

( * ) Notice: Subject to any disclaimer, the term of this patent is extended or adjusted under 35 U.S.C. 154(b) by 469 days.

(21) Appl. No.: 14/818,015

(22) Filed: Aug. 4, 2015

(65) Prior Publication Data

US 2016/0045943 A1 Feb. 18, 2016

Related U.S. Application Data

(60) Provisional application No. 62/038,019, filed on Aug. 15, 2014.

(51) Int. Cl.
*G05B 23/02* (2006.01)
*B08B 9/032* (2006.01)
(Continued)

(52) U.S. Cl.
CPC ............. *B08B 9/0325* (2013.01); *A01J 7/022* (2013.01); *B08B 9/027* (2013.01); *B08B 9/08* (2013.01);
(Continued)

(58) Field of Classification Search
CPC ........... G05B 2219/31318; G05B 2219/31265; G05B 23/0272; G06Q 10/06393; G06Q 30/04; B08B 9/027; A01J 7/022
(Continued)

(56) References Cited

U.S. PATENT DOCUMENTS 2,897,829 A 8/1959 Arrington et al.
4,061,504 A * 12/1977 Zall .................. A01J 7/022
119/14.18

(Continued)

OTHER PUBLICATIONS

Jude, Benjamin, and Eric Lemaire. "How to Optimize Clean-in-Place (CIP) Processes in Food and Beverage Operations." How to Optimize Clean-in-Place (CIP) Process | Schneider Electric, Schneider Electric, Dec. 9, 2013, www.schneider-electric.us/en/download/document/998-2095-12-09-13AR0_EN/.*

(Continued)

*Primary Examiner* — Michael T Tran
(74) *Attorney, Agent, or Firm* — Fredrickson & Byron, P.A.

(57) ABSTRACT

One embodiment includes a method for simulating an operational effect of one or more changes in a CIP process. The method includes providing a graphical user interface configured to receive inputs from a user, receiving at least one proposed adjustment to one CIP phase of the CIP process, and generating a simulated CIP process based on a first set of CIP data and the at least one proposed adjustment to generate simulated CIP data based on the simulated CIP process. The simulated CIP data is displayed on the display. The simulated CIP data includes at least one of the amount or the total cost of each consumable used to generate the simulated CIP data. A total cost of the simulated CIP process is calculated, where the total cost of the simulated CIP process incorporates the proposed adjustment.

12 Claims, 9 Drawing Sheets

(51) Int. Cl.
  *G06Q 10/06* (2012.01)
  *G06Q 30/04* (2012.01)
  *A01J 7/02* (2006.01)
  *B08B 9/027* (2006.01)
  *B08B 9/08* (2006.01)
  *B08B 13/00* (2006.01)
  *G05B 19/418* (2006.01)

(52) U.S. Cl.
  CPC ........ *B08B 13/00* (2013.01); *G05B 19/41835* (2013.01); *G05B 23/0272* (2013.01); *G06Q 10/06393* (2013.01); *G06Q 30/04* (2013.01); G05B 2219/31265 (2013.01); G05B 2219/31318 (2013.01); G05B 2219/32128 (2013.01); G05B 2219/32343 (2013.01)

(58) Field of Classification Search
  USPC .............................................. 706/14; 705/39
  See application file for complete search history.

(56) References Cited

U.S. PATENT DOCUMENTS

| | | | | |
|---|---|---|---|---|
| 4,230,592 | A * | 10/1980 | Miller | C11D 3/044 252/175 |
| 4,258,070 | A * | 3/1981 | Ridgway, Jr. | A23G 9/305 426/495 |
| 4,836,420 | A | 6/1989 | Kromrey | |
| 5,047,164 | A | 9/1991 | Corby et al. | |
| 5,064,561 | A | 11/1991 | Rouillard | |
| 5,282,889 | A | 2/1994 | Franklin et al. | |
| 5,348,058 | A | 9/1994 | Ruhl | |
| 5,405,452 | A | 4/1995 | Anderson et al. | |
| 5,417,153 | A * | 5/1995 | King | B01J 2/003 99/485 |
| 5,427,126 | A | 6/1995 | Carney et al. | |
| 5,533,552 | A | 7/1996 | Ahlers | |
| 5,888,311 | A | 3/1999 | Laufenberg et al. | |
| 6,006,171 | A | 12/1999 | Vines et al. | |
| 6,071,356 | A | 6/2000 | Olsen et al. | |
| 6,089,242 | A | 7/2000 | Buck | |
| 6,136,362 | A | 10/2000 | Ashton | |
| 6,161,558 | A | 12/2000 | Franks | |
| 6,287,515 | B1 | 9/2001 | Koosman et al. | |
| 6,391,122 | B1 | 5/2002 | Votteler et al. | |
| 6,423,675 | B1 | 7/2002 | Coughlin et al. | |
| 7,249,356 | B1 * | 7/2007 | Wilson | G05B 19/41865 700/17 |
| 7,529,688 | B2 * | 5/2009 | Prakash | G06Q 30/06 705/26.1 |
| 8,984,360 | B2 * | 3/2015 | Al Za'noun | G06Q 10/06395 714/701 |
| 9,417,078 | B1 * | 8/2016 | Seibert | G07C 5/0858 |
| 9,898,786 | B2 * | 2/2018 | Brown | G06Q 50/06 |
| 2004/0187897 | A1 | 9/2004 | Kenowski et al. | |
| 2006/0059018 | A1 * | 3/2006 | Shiobara | G06Q 10/06 705/2 |
| 2009/0043625 | A1 | 2/2009 | Yao | |
| 2009/0265025 | A1 * | 10/2009 | Brown | B01J 19/0006 700/98 |
| 2010/0076809 | A1 * | 3/2010 | Eryurek | G05B 15/02 702/182 |
| 2010/0093078 | A1 * | 4/2010 | Wang | C12M 21/02 435/325 |
| 2011/0056522 | A1 * | 3/2011 | Zauner | B01D 65/02 134/27 |
| 2011/0152156 | A1 * | 6/2011 | Sauter | C11D 1/66 510/234 |
| 2011/0197920 | A1 | 8/2011 | Kenowski et al. | |
| 2011/0207916 | A1 * | 8/2011 | Kyhse-Andersen | C07K 1/22 530/387.1 |
| 2012/0070553 | A1 * | 3/2012 | Hockett | A47J 37/1214 426/438 |
| 2013/0073450 | A1 * | 3/2013 | Swan | G06Q 40/00 705/39 |
| 2014/0090606 | A1 * | 4/2014 | Heacox | A01K 1/12 119/603 |
| 2014/0170276 | A1 * | 6/2014 | Nelles | A01J 25/008 426/243 |
| 2014/0209127 | A1 * | 7/2014 | Pathak | C11D 1/06 134/26 |
| 2015/0135016 | A1 * | 5/2015 | Glaser | G06F 11/079 714/37 |
| 2015/0296739 | A1 * | 10/2015 | Nelles | B01F 7/082 426/511 |
| 2016/0046503 | A1 * | 2/2016 | Hoek | C02F 1/008 210/636 |
| 2016/0048779 | A1 | 2/2016 | Curran et al. | |
| 2016/0051936 | A1 * | 2/2016 | Kim | B01D 63/02 210/636 |
| 2016/0185474 | A1 * | 6/2016 | Bronner | A23L 2/42 53/425 |
| 2016/0185584 | A1 * | 6/2016 | Hayakawa | B67C 7/0073 53/426 |
| 2016/0312159 | A1 * | 10/2016 | Athneil | C11D 7/265 |

OTHER PUBLICATIONS

Parraga, John. "Improve Operations Productivity." Https://Www.rockwellautomation.com/Resources/Downloads/Rockwellautomation/Pdf/Events/Automation-Fair/2012/Tech-Sessions/t49_design-Considerations-Auto-and-Manual-Batch.pdf, Rockwell Automation, Nov. 5, 2012.*

International Search Report and Written Opinion for PCT/US2015/043832, dated Nov. 19, 2015, 11 pages.

European Patent Application No. 15832365.9, Extended European Search Report dated Mar. 5, 2018, 12 pages.

* cited by examiner

Baseline/Benchmark

☆ >> Analysis >> Baseline/Benchmark

Benchmark Name* [Name]

Description [Description]

Notes [Notes]

Area Name: Truck Bays     Start Date: 04/28
End Date: 06/29     Wash Count: 1464

Benchmark Summary for 9 Weeks     < Hide Header

| Select | Time Period Range | Total no. of Wash | No. of washes with triggered exceptions | No. of washes without triggered exceptions | City Water (gal) | Exelerate CIP (gal) |
|---|---|---|---|---|---|---|
| ○ | 05/05 to 05/11 | 165 | 35 | 130 | 59,675 | |
| ○ | 05/12 to 05/18 | 163 | 39 | 124 | 56,160 | |
| ○ | 05/19 to 05/25 | 190 | 43 | 147 | 51,216 | |
| ○ | 05/26 to 06/01 | 155 | 38 | 117 | 220,673 | |
| ○ | 06/02 to 06/08 | 170 | 36 | 134 | 165,041 | |
| ○ | 06/09 to 06/15 | 164 | 37 | 127 | 125,856 | |
| ⦿ | 06/16 to 06/22 | 143 | 35 | 108 | 57,186 | |
| ○ | 06/23 to 06/29 | 147 | 53 | 94 | 52,875 | |

Items per page [20 ▼]     Displaying 1 - 9 of 9     Page [1] of 1

Cancel | Create Benchmark

FIG. 2

| Simulate Phase Summary | | | | | | | |
|---|---|---|---|---|---|---|---|
| Tank Prerinse B | 00:05:01 | Water | City Water | 327.7 | 0.0 | gal | $0.0040 | $1.31 | $0.00 |
| | | Electrical Energy | CS402_Supplypump | 0.9 | 0.0 | kWh | $0.0400 | $0.03 | $0.00 |
| | | | CS402_Returnpump | 0.9 | 0.0 | kWh | $0.0400 | $0.03 | $0.00 |
| Tank Alkaline Wash | 00:31:38 | Chemical | Exelerate CIP | 0.3 | 0.0 | gal | $5.3000 | $1.63 | $0.00 |
| | | Electrical Energy | CS402_Supplypump | 5.9 | 0.0 | kWh | $0.0400 | $0.24 | $0.00 |
| | | | CS402_Returnpump | 5.9 | 0.0 | kWh | $0.0400 | $0.24 | $0.00 |
| | | Thermal Energy | Thermal | 0.2 | 0.0 | Dth | $6.8750 | $1.12 | $0.00 |

FIG. 3

Modify Simulated Wash Phase Details

| Utilized Amount | Utilized Amount UOM | Material Type | Material Name | Material Cost/Unit (USD) | Material UOM | Deterioration Degree (%) | Total Consumed Amount | Difference Amount | Total Cost (USD) | Difference Cost (USD) | Action |
|---|---|---|---|---|---|---|---|---|---|---|---|
| 0.3 | gal | Alkaline | Exelerate CIP | $5.3000 | gal | 100 | 0.3 | | $1.63 | | |
| | | | | | | | Total Actual Cost | | $1.63 | | |
| 0.1 | gal | Alkaline ▼ | Exelerate CIP ▼ | 5.7500 | gal ▼ | 100 | 0.1 | 0.2 | $0.77 | $0.86 | 🗑 ✖ |
| ☐ valid | | | | | | | Total Simulated Cost | | $0.77 | | |
| | | | | | | | Net Difference (Simulate − Actual) Cost | | $−0.86 | | |

Recalculate  Cancel  Save

Phases

Actual Wash: 152 - Bay #2 Rear - 08/15/14 - 07:00:34

| Phase Name | Phase Duration | Phase Detail - Consumption | | | | |
|---|---|---|---|---|---|---|
| | | Material Category | Material Name | UOM | Amount | Cost (USD) |
| PreRinse | 00:02:38 | Electrical | Electricity | kWh | 0.43 | $ 0.02 |
| | | | Electricity | kWh | 0.29 | $ 0.01 |
| | | Water | City Water | gal | 160.31 | $ 0.03 |
| | | | | Total electrical cost | | $ 0.64 |
| | | | | Material cost of phase | | $ 0.67 |
| | | Electrical | Electricity | kWh | 1.40 | $ 0.06 |

Perfect Wash: 152 - Bay #2 Rear - 08/15/14 - 11:05:22 ☆

| Phase Name | Phase Duration | Phase Detail - Consumption | | | | |
|---|---|---|---|---|---|---|
| | | Material Category | Material Name | UOM | Amount | Cost (USD) |
| PreRinse | 00:02:37 | Electrical | Electricity | kWh | 0.43 | $ 0.02 |
| | | | Electricity | kWh | 0.29 | $ 0.01 |
| | | Water | City Water | gal | 144.20 | $ 0.03 |
| | | | | Total electrical cost | | $ 0.38 |
| | | | | Material cost of phase | | $ 0.61 |
| | | Electrical | Electricity | kWh | 1.50 | $ 0.06 |

Wash Consumption & Cost Summary

Exceptions

[Re-compare] [PerfectWash Library] [Wash Library]

CIP WASH COMPARISON AND SIMULATION

This application claims priority to U.S. Provisional Patent Application No. 62/038,019, filed Aug. 15, 2014. The entire contents of this application are incorporated herein by reference. U.S. patent application Ser. No. 14/818,028, entitled "CIP WASH SUMMARY AND LIBRARY," filed Aug. 4, 2015, is related to this application.

TECHNICAL FIELD

This disclosure relates generally to clean-in-place systems and processes, and data pertaining to clean-in-place systems and processes.

BACKGROUND

Food processing equipment, such as that found in dairies, tanks, pumps, valves and fluid piping, typically includes tanks, pumps, valves, and fluid piping. This food processing equipment often needs to be cleaned between each lot of product processed through the equipment. However, the tanks, pumps, valves, and piping can be difficult to clean because the various components may be difficult to access and disassemble for cleaning. Because of these cleaning difficulties, many food processing plants now use clean-in-place systems in which the tanks, pumps, valves, and piping of the food processing equipment remain physically assembled, and various cleaning, disinfecting, and rinsing solutions are circulated by the clean-in-place system through the food processing equipment to affect the cleaning process.

An example clean-in-place cleaning cycle normally begins with a pre-rinse cycle wherein water is pumped through the food processing equipment for the purpose of removing loose soil in the system. Typically, an alkaline wash would then be recirculated through the food processing equipment. This alkaline wash would chemically react with the soils of the food processing equipment to further remove soil. A third step would again rinse the food processing equipment with water, prior to a fourth step wherein an acid rinse would be circulated through the batch processing system. The acid rinse would neutralize and remove residual alkaline cleaner and remove any mineral deposits left by the water. Finally, a post-rinse cycle would be performed, typically using water and/or a sanitizing rinse. Such clean-in-place systems (and associated cleaning compositions) are known in the art, and examples can be found in U.S. Pat. Nos. 6,423,675; 6,391,122; 6,161,558; 6,136,362; 6,089,242; 6,071,356; 5,888,311; 5,533,552; 5,427,126; 5,405,452; 5,348,058; 5,282,889; 5,064,561; 5,047,164; 4,836,420; and 2,897,829.

Clean-in-place processes can vary widely in complexity. Some clean-in-place processes include various pieces of equipment, sometimes called clean-in-place objects, operating in conjunction and/or in succession. Data regarding clean-in-place processes and object operation is often stored as an unorganized mass of data, and is often incomprehensible to those without extensive experience in the clean-in-place industry. As a result, a typical user of a system on which clean-in-place processes are performed is unable to analyze clean-in-place process data to notice areas of potential improvement or non-ideal operation in the clean-in-place process. Generally, the user does not have more than a very basic understanding of how operation of a system changes from process to process or how actions taken by the user can affect the system operation.

SUMMARY

This disclosure in general relates to systems and methods of cataloging, arranging, and viewing clean-in-place (CIP) data. Moreover, this disclosure provides for use of such data to simulate changes in a wash recipe in a CIP system. In performing a simulation, wash and/or phase summary data can appear in a simulate wash and/or phase summary and permit a user to adjust one or more parameters in one or more phases of the wash summary. After adjusting one or more parameters, a user can cause the system to recalculate aspects of the wash from the wash summary utilizing the adjusted parameters, and in some instances the user's remaining unadjusted parameters. Thus, the simulation can be performed utilizing the CIP system user's own data (e.g., from past CIP washes), tailoring the simulation to the particular CIP system and allowing the user to determine a best practice with regard to their own system.

One embodiment includes a method for simulating an operational effect of one or more changes in a CIP process, where the CIP process includes at least two CIP phases. The method includes, using one or more programmable processors, accessing a first set of CIP data from a CIP database where the first set of CIP data is associated with the CIP process and includes an amount of each of a plurality of consumables consumed during the CIP process. The method further includes, using one or more programmable processors, associating a price with each consumable consumed in the CIP process, calculating (i) the total cost of each consumable used in the CIP process and (ii) the total cost of the CIP process where each is based on the amount and price of the consumables consumed, and displaying at least a portion of the first set of CIP data on a display. The displayed CIP data includes at least one of (iii) the amount or (iv) the total cost of each consumable used in the CIP process. In addition, the method includes providing, using the one or more programmable processors, a graphical user interface configured to receive inputs from a user, receiving, using the graphical user interface, at least one proposed adjustment to one CIP phase of the CIP process, generating, using the one or more programmable processors, a simulated CIP process based on the first set of CIP data and the at least one proposed adjustment, generating, using the one or more programmable processors, simulated CIP data based on the simulated CIP process, and displaying, using one or more programmable processors, the simulated CIP data on the display. The simulated CIP data includes at least one of (v) the amount or (vi) the total cost of each consumable used to generate the simulated CIP data. A total cost of the simulated CIP process is calculated, where the total cost of the simulated CIP process incorporates the proposed adjustment.

A further embodiment includes a method for simulating chemistry replacement in a CIP process. The method includes receiving a first set of CIP data associated with the CIP process having first and second CIP phases and using a plurality of consumables where one of the plurality of consumables includes a first chemistry. The first chemistry is used in the first CIP phase and the first set of CIP data comprises an amount of each of the plurality of consumables used during the CIP process. The method further includes associating a price with each of the plurality of consumables used during the CIP process, calculating a total cost of the CIP process, displaying the received first set of CIP data on a display such that the displayed first set of CIP data includes at least one of (i) the amount and (ii) the cost of each of the plurality of consumables used in the CIP process, and receiving, via an interface, at least one hypothetical adjustment to the first chemistry used in the first CIP phase. In addition, the method includes simulating an execution of the CIP process utilizing the first set of CIP data and the hypothetical adjustment to the first chemistry creating simulated CIP data associated with a simulated CIP process, and displaying the simulated CIP data on the display such that the displayed simulated CIP data includes at least one of (i) the amount and (ii) the cost of each of the plurality of consumables used in the simulated CIP process. A total cost of the simulated CIP process incorporating the hypothetical adjustment to the first chemistry is calculated.

Another embodiment includes a CIP system. The CIP system has a CIP object including an input, a first chemistry in fluid communication with the input of the CIP object, a sensor configured to detect one or more operating conditions of the CIP system, and a controller in communication with the sensor. The controller is configured to control fluid communication between the first chemistry and the CIP object as well as to carry out a first CIP process, including more than one phase, on the CIP object according to a recipe. The controller includes one or more programmable processors and a non-transitory computer-readable storage article having computer-executable instructions stored thereon to cause at least one programmable processor to collect and store a first set of CIP process data corresponding to the first CIP process, where the first set of CIP process data includes one or more operating conditions of the CIP system detected by the sensor. The at least one programmable processor is also caused to access a library of CIP process data that includes a plurality of sets of CIP process data corresponding to CIP processes performed previous to the first CIP process, receive user input that includes a selection of a second set of CIP process data corresponding to a second CIP process including more than one phase, where the second set of CIP process data is selected from the library of CIP process data, and display via a user interface at least portions of both the first set of CIP process data and the second set of CIP process data such that at least a portion of the first set of CIP process data and a portion of the second set of CIP process data are simultaneously presented for comparison. The first CIP process and the second CIP process share at least one common CIP phase, such that the compared portions of the first and second sets of CIP process data comprise CIP process data regarding the at least one common CIP phase.

BRIEF DESCRIPTION OF DRAWINGS

FIG. 2 is an exemplary baseline/benchmark creation interface.

FIG. 3 is an exemplary simulation interface which can be presented to a user.

FIG. 4 is an exemplary interface for allowing a user to modify chemical parameters of a phase.

FIG. 6 is an exemplary interface showing how the system provides a library of washes specifically designated as "perfect washes."

FIG. 8B is a lower portion of an exemplary interface showing how the system displays a comparison of an actual wash to the selected perfect wash.

DETAILED DESCRIPTION

As described, clean-in-place (CIP) systems can be used to clean equipment without requiring disassembly of entire systems. In general, a CIP process is applied to one or more objects to be cleaned, hereinafter a "CIP object" or "object". Typical CIP objects can include, for example, tanks, silos, pumps, fillers, valve clusters, or objects that clean stand-alone, such as pasteurizers, separators, membrane filtration equipment, evaporators, and driers. The object is cleaned by process of a CIP wash. A CIP wash can include one or more CIP phases. CIP phases are generally more specific than the wash itself, and in some examples are defined by a set of operating parameters within a CIP wash. For example, a CIP phase might include a rinse phase, during which water is passed through the CIP object in order to rinse the object. Other exemplary CIP phases can include a pre-rinse, a post-rinse, alkaline wash, acid sanitize, rinse recovery, chemical recovery, or sterilization. In general, a CIP wash can include one or more CIP phases.

CIP washes, and likewise CIP phases, can consume one or more consumables during the execution of a wash or phase. For example, auxiliary CIP equipment such as pumps, valves, etc. can consume electrical energy during operation. In addition, various phases can require the addition of water and/or one or more chemicals such as an alkaline or an acid (generally "chemistry"). In some such phases, water and/or chemistry is heated to a desired temperature, using thermal energy. Thus, exemplary consumables consumed during a CIP phase or a CIP wash can include electrical energy, thermal energy, water, chemistry, and time.

During a CIP wash, a series of pumps, valves, and other equipment can be used to perform various phases of the wash. Such equipment can be controlled, for example, by a controller configured to carry out CIP phases and washes. A controller can include memory for storing CIP wash and phase recipes indicating which valves to open and/or which pumps to activate at which times during a CIP wash. The controller can be programmed by a user to update or save new wash recipes.

Figure 1:
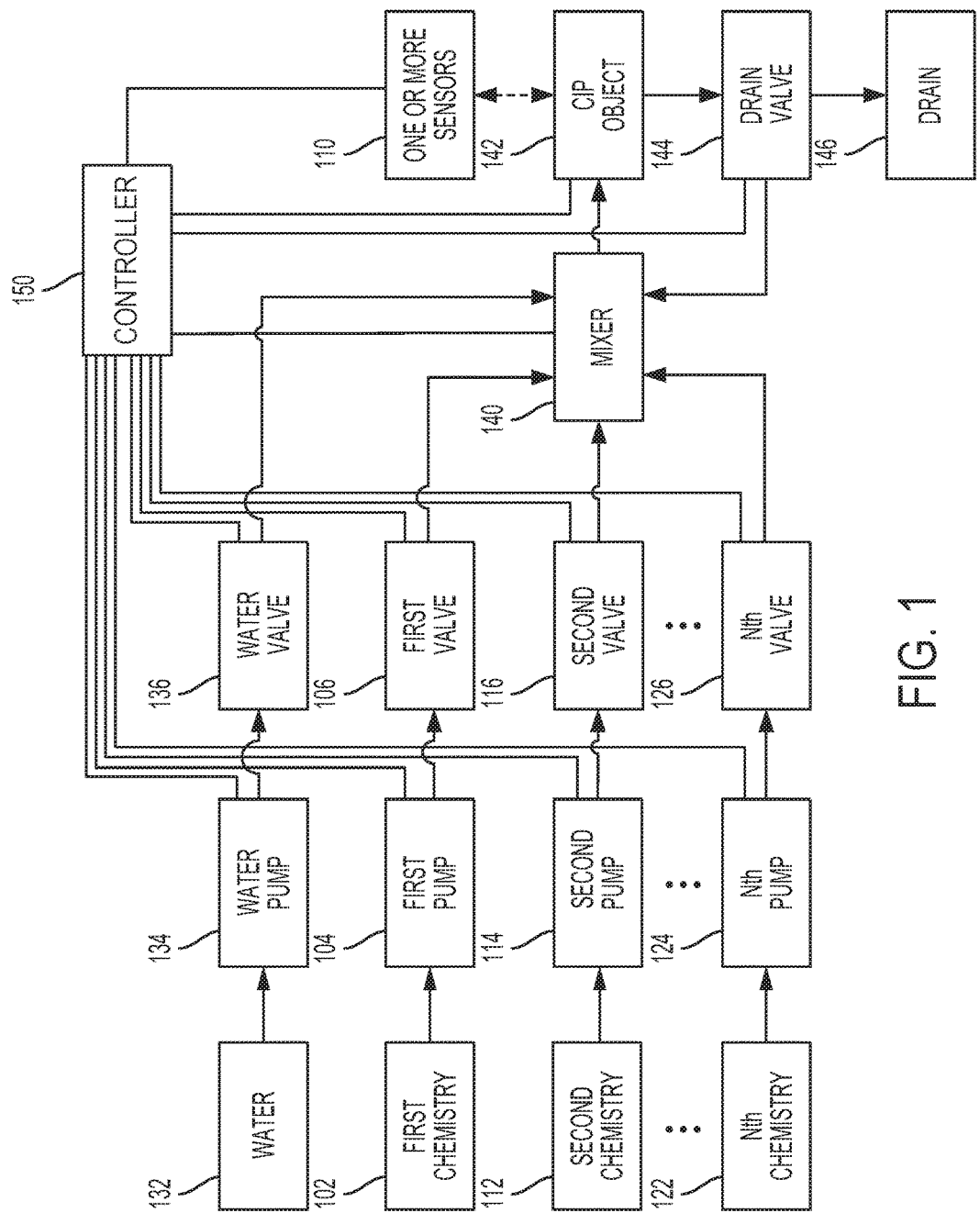
FIG. 1 is an exemplary schematic diagram of a CIP system.

FIG. 1 is an exemplary schematic diagram of a CIP system. As shown, a number of chemistries (first chemistry 102—Nth chemistry 122) are in communication with a CIP object 142. For simplicity, the fluid flow of first chemistry 102 will be explained in detail, however it will be clear that similar operation can be employed among each of the other chemistries. In the illustrated CIP system, the first chemistry 102 is pumped by a first pump 104 toward a mixer 140. The term mixer is used to describe the area where the chemical detergents are combined with the water source to create the cleaning solution. It can consist of either a hydraulically suited mixing line segment, a circulation tank, or simply the suction side of a delivery pump in the CIP circuit. A first valve 106 in the flow path of the first chemistry 102 can act to prevent the first chemistry 102 from reaching the mixer 140. In various embodiments, flow control can be performed by either the first valve 106, the first pump 104, or a combination thereof. In some embodiments, the first valve 106 is positioned ahead of the first pump 104 in the flow path of the first chemistry 102, while in other embodiments, the first valve 106 is positioned after the first pump 104.

The mixer 140 is configured to receive the first chemistry 102, as well as any other of the second chemistry 112 through Nth chemistry 122. The mixer 140 can also be configured to receive water 132 via a water line comprising a water pump 134 and a water valve 136 which can be arranged in a similar configuration as the chemistry input lines. In general, the mixer 140 can be any system component receiving chemistries and/or water intended to be directed toward the CIP object 142. In some embodiments, the mixer 140 can actively mix fluids therein, while in other embodiments, fluids merely are dispensed into the mixer 140 simultaneously. In some such embodiments, various chemistries and water are substantially mixed within the CIP object 142 during the CIP process and need not be mixed by the mixer 140. In general, the mixer 140 receives any combination of water 132 and any of the first 102 through Nth 122 chemistries prior to the combination of any such fluids being directed toward the CIP object 142.

In some embodiments, the timing and dosing of water 132 or any of first 102 through Nth 122 chemistries can be controlled by a controller (not shown) in communication with any corresponding pumps and/or valves. As discussed, various CIP washes and phases can be characterized by recipes stored in and/or carried out by the controller. For example, during a first phase, the controller may cause the first valve 106 to open and the first pump 104 to dose first chemistry 102 to the mixer 140 and CIP object 142. The controller can be configured to dose a predetermined volume of the first chemistry 102, to dose the first chemistry 102 for a predetermined amount of time, or to dose the predetermined chemistry 102 until a predetermined event occurs. At the completion of the first phase, the controller may stop the dosing of the first chemistry 102 by closing the first valve 106 and/or stopping the first pump 104. The controller can begin a second phase, for example, by dosing the second 112 and Nth 122 chemistries toward the mixer 140 via the second pump 114 and valve 116 and the Nth pump 124 and valve 126, respectively. The second 112 and Nth 122 chemistries can combine in the mixer 140 before being directed to the CIP object 142. In general, the controller can operate to dose any combination of chemistries toward the mixer 140 and CIP object 142. Such chemistries can be diluted as desired by further dosing water 132 via the water pump 134 and water valve 136. In addition, various phases may be preceded or followed by a rinse phase, in which water 132 is provided to the CIP object 142 to rinse away residual chemistries or other residue from the CIP object operation.

In general, the CIP object 142 has at least one input for receiving a solution from the mixer 140 and at least one output through which the solution exits the object. As shown in the illustrated figure, a solution exiting the CIP object 142 can encounter a drain valve 144, which can act to direct the fluid back to the mixer 140 or toward a drain 146. In some embodiments, CIP process solution is recycled and run through the system a plurality of times, while other times, the CIP process solution is directed through the CIP object 142 a single time before being sent to the drain 146. A controller can monitor the number of times that a solution has traveled through a CIP object 142 and can control the drain valve 144 according to the number of times the solution is intended to travel through the CIP object 142.

CIP systems can include one or more sensors 110 for detecting various operating conditions of the CIP system or a CIP process solution flowing therethrough. As shown in the illustrated embodiment, the one or more sensors 110 are shown as being in communication with the CIP object 142. However, it will be appreciated that the one or more sensors can be dispersed throughout the system, such as in the mixer 140, proximate the input or output of the CIP object 142, or any other appropriate position in the system. For example, one or more sensors 110 can be positioned in any of the water 132 or first 102 through Nth 122 chemistry lines to monitor properties of each individual line. Various sensors can include, for example, temperature sensors, conductivity sensors, optical sensors, flow meters, electricity consumption meters and the like. The one or more sensors 110 can be in communication with the controller for communicating readings thereto.

During a CIP process (e.g., wash, phase), data can be generated regarding the process. For example, data collected by the one or more sensors 110 of FIG. 1 throughout the duration of the process can be saved to memory by the controller. Exemplary types of data that can be stored include duration of various phases, the electrical or thermal energy consumed during various phases by various pieces of equipment, the temperature of CIP process fluid, an amount of water or chemistry used during a phase or a wash, or the like.

In general, a large amount of CIP data regarding various operating parameters can be stored. In typical CIP systems, this data is unorganized and can be complicated and difficult for untrained users to interpret. For instance, without expert knowledge of CIP systems, a typical operator may not be able to distinguish between various CIP phases or troubleshoot CIP process equipment malfunction with raw CIP data generated by a typical system.

In embodiments of the present invention, the controller can be configured to combine CIP data acquired during a CIP wash to better provide context to a system operator. For example, the controller can combine data such as valve positions, temperature, flow duration, etc. to determine when during a CIP wash various CIP phases begin and end. In some examples, the controller can collect and store data from CIP processes in a wash summary. Data can be grouped together by phase, by consumable, or by other logical parameters in order to provide specific phase, consumable, or other information regarding an entire wash. The wash summary can be saved as a whole to memory.

Wash summaries can be cataloged and saved in a wash library, providing an easy way to find and analyze past wash summaries, or to view information regarding various wash summaries side-by-side. Wash summaries and the wash library can be sortable by various properties measured during washes by CIP equipment. Additionally, wash summaries and the wash library can include exception data, indicating the one or more parameters during one or more phases of one or more washes met a condition defined by the user. Such a parameter meeting such a defined condition triggers an exception so that the user can immediately be aware that such a condition was met. Wash summaries, exceptions, and a wash library are detailed in U.S. patent application Ser. No. 14/818,028, entitled "CIP WASH SUMMARY AND LIBRARY," filed concurrently with this application on Aug. 4, 2015 and which is hereby incorporated by reference in its entirety.

Within the wash library, a user can select particular time ranges of wash occurrences to flag as a baseline or a benchmark within the CIP monitoring system. In general, a baseline and a benchmark can be used differently by the user. For example, a baseline can be set over a period of time (e.g., 1 week, 4 weeks, etc.) shortly after the installation of the CIP monitoring platform which can be used to indicate current consumption amounts, thus establishing a baseline for future operation of the system. Benchmark washes may be saved because of some noteworthy occurrence after the installation process. For example, seasonal variation in ambient or incoming water temperature, changes in production throughput over an annual cycle, alterations in product quality, plant expansions, or modifications to cleaning procedures to reduce consumption would be typical reasons to set aside a grouping of wash occurrences over a period of time as a benchmark. In general, the setting of baselines and benchmarks is done in a similar fashion, and a difference is that the baseline time period is meant to be the initial or original benchmark at any given facility; thus, it will be appreciated that the terms can be functionally used interchangeably, as each can be saved and otherwise utilized by a user similarly.

Baseline and benchmark consumption periods can be stored in or otherwise linked to from a database of exclusively baseline and benchmark periods. Thus, a user can navigate to the database of baseline and benchmark washes to more quickly locate consumption details for the selected time frame. For example, a user may wish to flag the first week in a new system so that the user can easily recall the wash data from the first wash to compare to subsequent washes in the future. Similarly, a user may wish to flag the first week or four week period in a system immediately after a system has undergone changes or other maintenance so that the user can more easily observe system change over time. In some other examples, a user may choose to establish a baseline or a benchmark time frame immediately before a system change so that the user can easily review wash data from prior to the change and compare with washes after the change has been implemented. In further examples, a user can save data, such as a number of triggered exceptions or a particularly cost-effective period. In general, a user can select a time period to be saved as a baseline or benchmark wash for a variety of reasons. Once a wash has been saved as a baseline or benchmark, a user can navigate the database of baselines and benchmarks and quickly and easily recall data from such washes.

FIG. 2 is an exemplary baseline/benchmark creation interface 200. In the illustrated interface 200, a user can select a time period from which to create a benchmark. As shown, a user can select one of several time period ranges 210-280 from which to create a benchmark. The interface can provide information to the user regarding each time period 210-280. Provided information can include the number of washes performed within the time period, the number of washes that triggered exceptions, the consumption of any number of consumables, the cost per consumable, the total operating cost, or any other available information. The user can select the desired time period, in this example time period 270, and elect to create a benchmark based on the data associated with that time period 270. In some embodiments, the data designated as benchmark data is stored in a benchmark library. Benchmark data can be moved or copied from the wash library to the benchmark library.

In some systems, a user can compare washes within the wash library to one another. In some embodiments, a user can select two or more washes from a wash library to be compared. In some embodiments, these washes can be presented in a manner similar to the wash summary of the incorporated application. Selected washes can be presented side-by-side for user comparison. The presented CIP data representative of each wash can include, for example, the duration of the wash, the amount of any of a number of consumables consumed, the cost of consuming the consumables, or any other data stored in the wash library. In some embodiments, a comparison between two or more washes includes presenting the difference between like parameters between those washes. For example, a wash comparison between a first wash and a second wash can include the total amount of water used in the first wash, the total amount of water used in the second wash, and the difference in the amount of water used between the first and second washes.

In some embodiments, a user can adjust how the wash comparison between two or more washes is presented. In some instances, the user can sort or filter the compared washes by any number of desired parameters. For example, a user can sort a number of washes selected for comparison by the total amount of water used in each wash. In doing so, the user can easily observe which of the selected washes consumes the most water during the course of the wash. In general, the user can sort washes by any available comparable parameter.

In some embodiments, the user is able to set aside specific washes for each object and recipe combination within the plant as a gold-standard or "perfect" wash. These washes are stored separately to allow for quick comparison to other washes on the same object or to other washes on any other object in the plant, whether they be similar, such as two similarly sized and used tanks in the facility, or dissimilar objects. There are no pre-requisites for the flagging of a wash as a perfect wash, so the user may define any wash that is interesting for any number of reasons. For example, the user may define a wash of a specific object/recipe combination because it is exemplary of the best possible CIP operation given the current status quo; however, the wash could also be flagged to indicate an improper CIP, due to quality, consumption, or duration to have easy access for comparison against future washes.

During exemplary operation, a user can recall a benchmark wash as described earlier for comparison with one or more additional washes. For instance, a user can save the last wash prior to implementing a change in the CIP system as a perfect wash. Once the changes to the CIP system have been implemented, a wash can be performed and quickly and easily compared to the designated perfect wash. Accordingly, the system user can easily observe the changes in wash summary data that are a result of the changes implemented into the CIP system. Subsequently, the user can save the wash summary of the new system as a baseline wash and easily compare future washes to this instance to observe system behavior over time.

Figure 5:
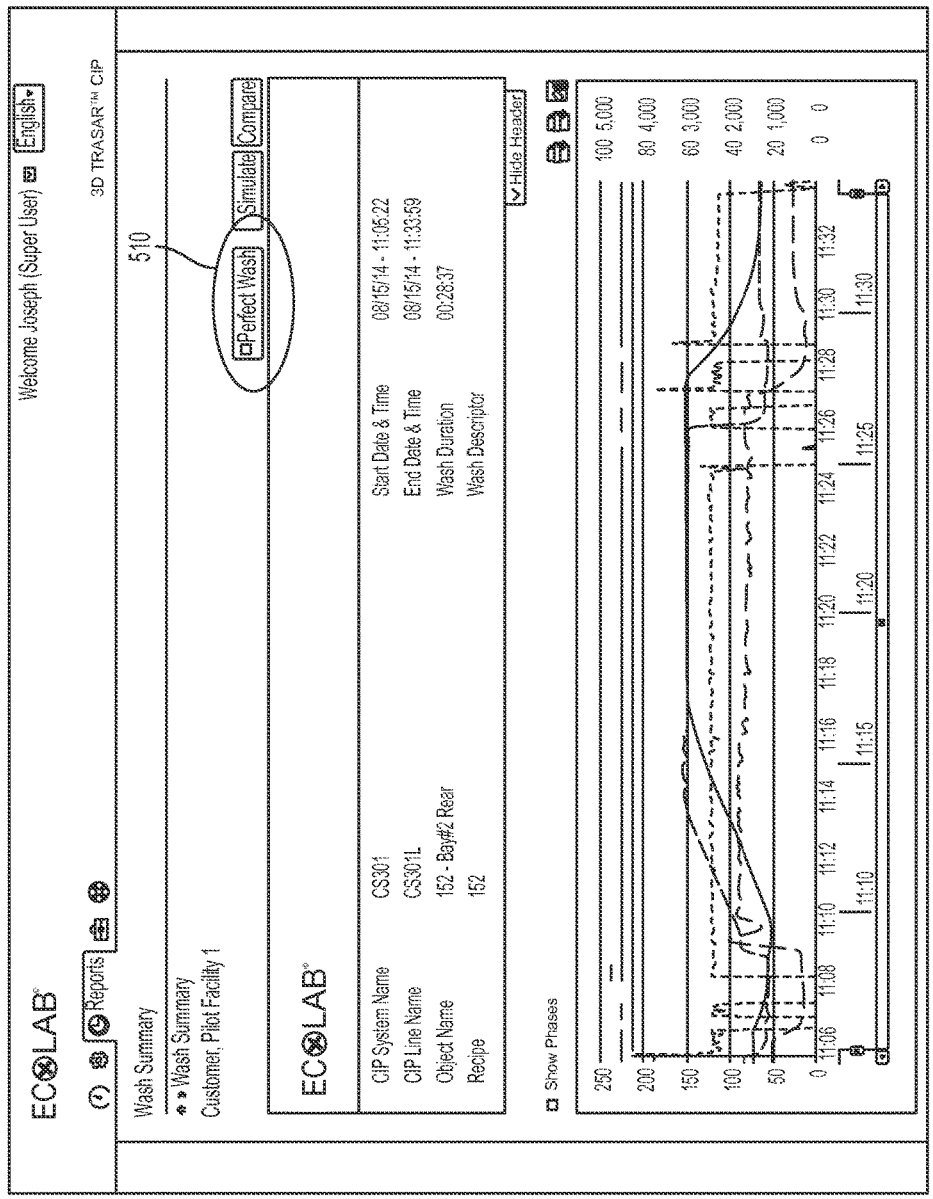
FIG. 5 is an exemplary interface showing how the system receives an indication, via a GUI, that the current wash should be designated as a "perfect wash."
Figure 6:
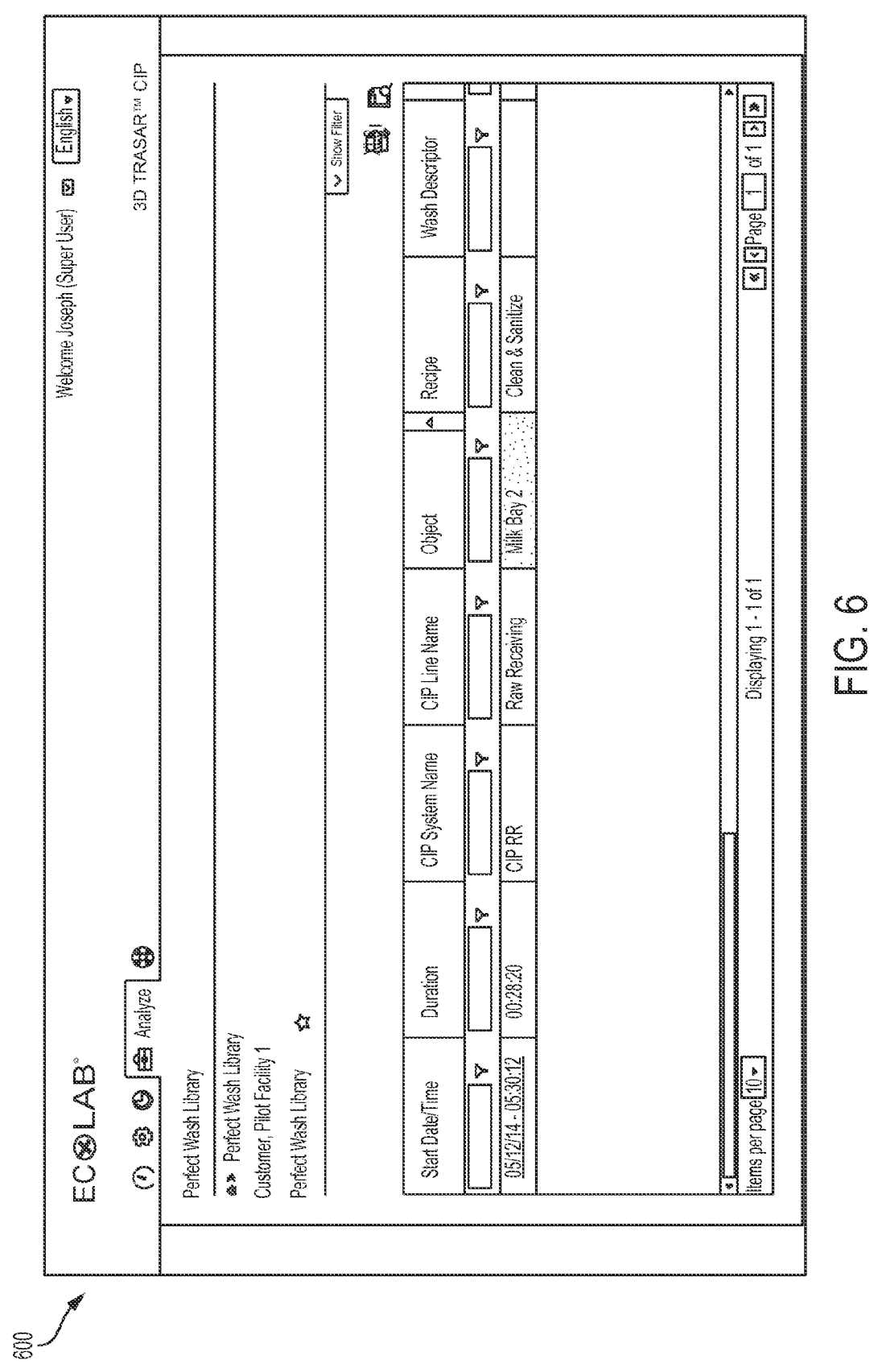
Figure 7:
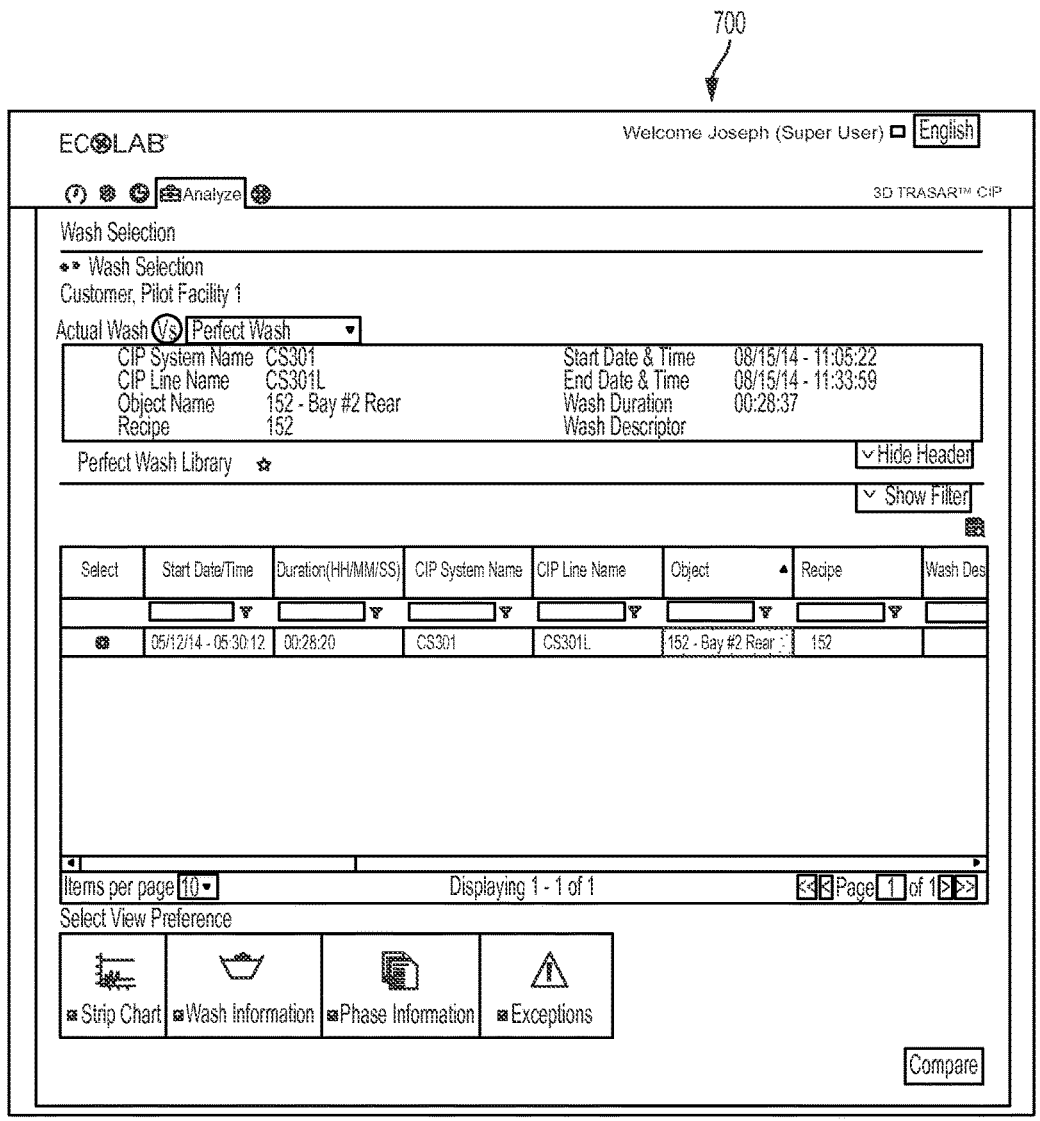
FIG. 7 is an exemplary interface showing how the system receives a selection of the perfect wash to which the system should compare to the actual wash.
Figure 8A:
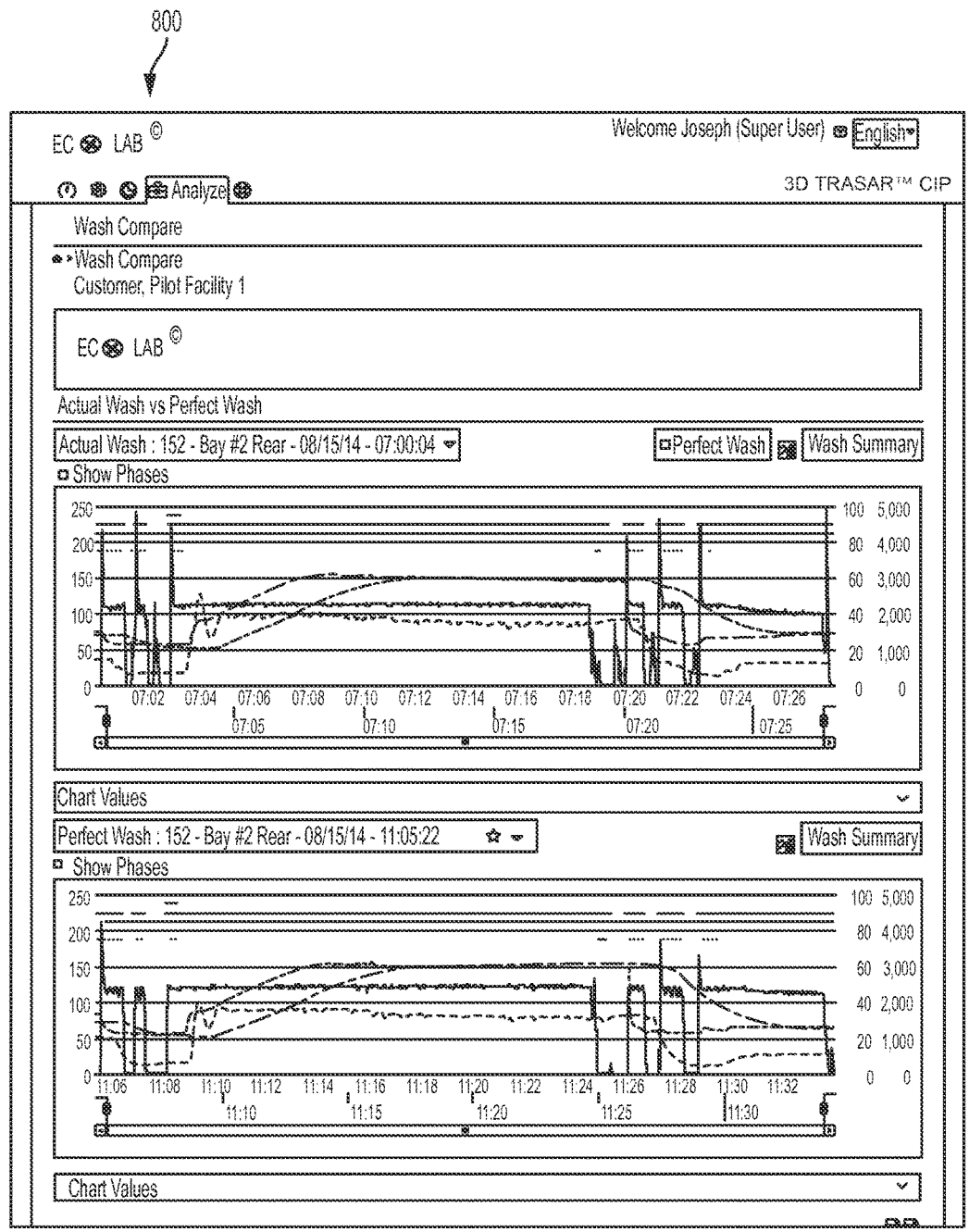
FIG. 8A is an upper portion of an exemplary interface showing how the system displays a comparison of an actual wash to the selected perfect wash.

FIG. 5 is an exemplary interface 500 showing how the system receives an indication via a graphical user interface (GUI) at region 510, that the current wash should be designated as a "perfect wash." FIG. 6 is an exemplary interface 600 showing how the system provides a library of washes specifically designated as "perfect washes." The library is structured similar to other system libraries. FIG. 7 is an exemplary interface 700 showing how the system receives a selection of the perfect wash to which the system should compare to a desired wash (e.g., a current or most recent wash). FIGS. 8A and 8B are upper 800 and lower 850 portions, respectively, of an exemplary interface showing how the system displays a comparison of an actual wash to the selected perfect wash.

A user can further use data in the wash library to simulate changes in a wash recipe in a CIP system. For example, a user can select with a wash summary comprising the user's own system data regarding a previous wash for adjusting. In some examples a user can select to enter a simulation from viewing an existing wash summary in the wash library. In other examples, a user can enter a simulation mode of operation and then select a wash summary from the wash library. As described in the incorporated application, the wash summary can include phase data and consumable data related to various CIP phases within the wash and consumables consumed within each phase and the wash in its entirety. During a simulation, wash and/or phase summary data can appear in a simulate phase summary or a simulate wash summary in which a user can choose to edit or adjust one or more parameters in one or more phases of the wash summary. In some embodiments, the user selects a phase of the wash from the simulate wash summary to adjust one or more parameters of the selected phase. In some instances, the user can eliminate a phase from, or add an entirely new phase to the simulated wash (e.g., a new phase using a new chemistry).

After editing a variety of parameters, a user can cause the system to recalculate aspects of the wash from the wash summary utilizing the adjusted parameters. In calculating the hypothetical cost of the simulation wash, the system utilizes the adjusted parameters in conjunction with the user's remaining unadjusted parameters to determine the simulated wash cost. Thus, the simulation can be performed utilizing the CIP system user's own data, tailoring the simulation to the particular CIP system. In some embodiments, the simulated wash summary can be saved in a simulated wash library for future access by the user. The simulated wash summary can be presented alongside the original wash summary for comparison analogous to the comparisons of washes from within the wash library described above. Similarly, two simulated wash summaries can be presented alongside one another for comparison.

Thus, in performing such a simulation, a user can view parameters of an existing wash summary and change one or more parameters in the wash to observe a predicted effect on the system operation. In various examples, the user can change any appropriate parameters, such as the type and/or amount of chemistry dosed, the desired temperature of chemistry, water, or a combination thereof in the system, the duration of a particular phase, etc. The system can then, based on the user's past data, simulate the effect of the adjusted parameters. The results can be displayed as a simulated wash summary together with the original wash summary, and the two can be compared. Running simulations based on the user's past data allows the user to determine a best practice with regard to their own system.

In one example, the simulation tool can be used to simulate the effect of a chemistry replacement in at least one CIP phase in a wash. In some instances, the replacement of one chemistry with another can affect wash parameters of the system in a predictable way. Accordingly, a user can adjust the one or more additional parameters affected by the chemistry change. For example, the user can adjust the cost and/or amount of the chemistry dosed during the at least one phase. Similarly, any other system changes (e.g., different temperature, different amount of water) can be input by the user. Running the simulation with these updated parameters can provide a detailed analysis to the user regarding the effect of the simulated change in chemistry without requiring the user to physically test the chemistry within the system.

In various embodiments, the simulation calculating, data lookup and saving, and receiving inputs from a user interface can be performed by one or more processors incorporated into the system. The one or more processors can be in communication with system memory for recalling wash summary data, cataloging wash summary data into a wash library, and indexing and recalling benchmark and baseline washes. In some embodiments, the processor is configured to connect to a network, such as the internet, for determining the cost of consumables from a database, or otherwise receiving data from or communicating data to a remote location. Thus, in such embodiments, the database can be remote from the controller of the CIP system and include present/real-time cost information for one or more consumables utilized in a CIP process. The CIP system, via the controller for example, can be in communication with the remote database via a network, such as the internet, to receive the present/real-time cost information for one or more consumables.

FIGS. 3-4 illustrate exemplary CIP simulation processes. FIG. 3 is an exemplary simulation interface 300 which can be presented to a user. The interface 300 includes one or more phases 310, 320 for selection by a user, along with data associated with each phase 310, 320 taken from the wash summary. The presented data can be existing data from a previous wash retrieved from a wash library as described in the incorporated application. In various embodiments, the user can select a simulation function from a list of options. In some examples, the user can select from any or all of copying a particular phase for reinserting into a simulate wash, editing a phase, or deleting a phase from a simulated wash.

In selecting to edit the phase data, the user can be presented with an interface for modifying one or more parameters regarding the phase. In some embodiments, a user can select between modifying parameters related to a particular consumable. FIG. 4 is an exemplary interface 400 for allowing a user to modify chemical parameters of a phase. As shown, the interface 400 includes original data from the original phase summary across one row 410, and one or more editable text boxes by which the user can enter an adjusted parameter across a second row 420. In such an embodiment, the user can easily observe differences between a proposed simulated phase and the original phase data. Once the user has entered the desired adjustments, the user can choose to recalculate parameters of the phase dependent on the adjusted variables, such as the total cost of the phase. In some examples, the system (e.g., via one or more processors) can display the calculated simulated parameters and/or display the net difference between the original and the simulated parameters. For example, in the illustrated example of FIG. 4, the Total Actual Cost of a phase is presented, the Total Simulated Cost of the simulated phase is presented, and the Net Difference Cost is presented. This allows a user to easily observe the predicted effect of the adjusted parameters on the phase cost. After adjusting parameters regarding a particular consumable in a phase or wash, a user can select another consumable and perform a similar simulation function. In general, a user can modify parameters related to any number of consumables, and observe effects on the phase and/or wash. In various examples, a user can view effects from any one of, or any combination of a series of simulation adjustments. In some embodiments, a user can save a simulated wash in a simulation library for future reference.

Various examples have been described. These and others are within the scope of the embodiments of the present invention.

The invention claimed is:

1. A method of comparing clean-in-place (CIP) process, the method comprising:

detecting, using a sensor, one or more operating conditions of a CIP system;
accessing, from a CIP database using a CIP controller including at least one programmable processor, a first set of CIP process data corresponding to a first CIP wash process, the first set of CIP process data comprising at least two CIP phases and an amount of each of a plurality of consumables consumed during the CIP process;
associating, using the CIP controller, a price with each consumable consumed in the CIP process;
calculating, using the CIP controller, (i) the total cost of each consumable used in the CIP process and (ii) the total cost of the CIP process, each based on the amount and price of the consumables consumed;
accessing, using the CIP controller, a library of CIP process data comprising a plurality of CIP processes performed previous to the first CIP wash process;
providing, using the CIP controller, a graphical user interface via a display device, the graphical user interface configured to receive inputs;
displaying, via the display device, at least a portion of the first set of CIP data on a display, the displayed CIP data including at least one of (iii) the amount or (iv) the total cost of each consumable used in the CIP process;
receiving, using an input device configured to receive inputs from a user, a selection of a second CIP wash process comprising at least two CIP phases, the second CIP wash process selected from the plurality of CIP processes in the library of CIP processes;
retrieving, using the CIP controller, a second set of CIP process data from the library of CIP process data, the second set of CIP process data corresponding to the second CIP wash process; and
displaying, using the graphical user interface on a display device, at least portions of the first set of CIP process data and the second set of CIP process data such that at least a portion of the first set of CIP process data and a portion of the second set of CIP process data are simultaneously presented for direct viewing and comparison;
receiving, using the input device, data corresponding to a proposed adjustment to a CIP phase of the CIP process;
generating, using the CIP controller:
a simulated CIP wash process based on the first set of CIP data and the proposed adjustment; and
simulated CIP data based on the simulated CIP wash process;
calculating, using the CIP controller, a total cost of the simulated CIP wash process, the total cost of the simulated CIP wash process incorporating the proposed adjustment;
displaying, using the CIP controller, the simulated CIP data on the display device, the simulated CIP data including at least one of: (v) the amount of each consumable used to generate the simulated CIP data, (vi) the total cost of each consumable used to generate the simulated CIP data, and (vii) the total cost of the simulated CIP wash process; and
controlling, using the CIP controller in communication with the sensor, fluid communication between a first chemistry and a CIP object of the CIP system, the controlling incorporating the proposed adjustment;
wherein the first CIP wash process and the second CIP wash process share at least one common CIP phase comprising at least one of a rinse phase, an alkaline wash, an acid sanitize, a rinse recovery, a chemical recovery, and a sterilization such that the presented portions of the first and second sets of CIP data comprise CIP process data regarding the at least one common CIP phase;
wherein the first and second sets of CIP process data comprise (i) the amount or cost of at least one consumable consumed in the at least one common CIP phase and (ii) the total cost of the at least one common CIP phase;
wherein displaying the first set of CIP process data and the second set of CIP process data further comprises displaying a difference in total cost of the at least one common CIP phase between the first and second CIP wash processes;
wherein the CIP database is remote from the CIP controller and in communication via a network with the CIP controller; and
wherein the CIP database includes a respective price associated with each consumable consumed in the CIP process.

2. A clean-in-place (CIP) system comprising:
a CIP object including an input;
a first chemistry in fluid communication with the input of the CIP object;
a sensor configured to detect one or more operating conditions of the CIP system;
a CIP controller in communication with the sensor, the CIP controller including one or more programmable processors and a non-transitory computer-readable storage article having computer-executable instructions stored thereon to cause the CIP controller to:
access, from a CIP database, a first set of CIP process data corresponding to a first CIP wash process, the first set of CIP process data comprising at least two CIP phases and an amount of each of a plurality of consumables consumed during the CIP process;
associate a price with each consumable consumed in the CIP process;
calculate (i) the total cost of each consumable used in the CIP process and (ii) the total cost of the CIP process, each based on the amount and price of the consumables consumed;
access a library of CIP process data comprising a plurality of CIP processes performed previous to the first CIP wash process;
provide a graphical user interface via a display device, the graphical user interface configured to receive inputs;
display, via the display device, at least a portion of the first set of CIP data on a display, the displayed CIP data including at least one of (iii) the amount or (iv) the total cost of each consumable used in the CIP process;
receive, using an input device configured to receive inputs from a user, a selection of a second CIP wash process comprising at least two CIP phases, the second CIP wash process being selected from the plurality of CIP processes in the library of CIP processes;
retrieve a second set of CIP process data from the library of CIP process data, the second set of CIP process data corresponding to the second CIP wash process; and
display, using the graphical user interface on a display device, at least portions of the first set of CIP process data and the second set of CIP process data such that at least a portion of the first set of CIP process data and a portion of the second set of CIP process data are simultaneously presented for direct viewing and comparison;

receive, using an input device configured to receive inputs from a user, data corresponding to a proposed adjustment to a CIP phase of the CIP process;

generate:
   a simulated CIP wash process based on the first set of CIP data and the proposed adjustment; and
   simulated CIP data based on the simulated CIP wash process;

calculate a total cost of the simulated CIP wash process, the total cost of the simulated CIP wash process incorporating the proposed adjustment;

display the simulated CIP data on the display device, the simulated CIP data including at least one of: (v) the amount of each consumable used to generate the simulated CIP data, (vi) the total cost of each consumable used to generate the simulated CIP data, and (vii) the total cost of the simulated CIP wash process; and control, incorporating the proposed adjustment, fluid communication between the first chemistry and the CIP object of the CIP system;

wherein the first CIP wash process and the second CIP wash process share at least one common CIP phase comprising at least one of a rinse phase, an alkaline wash, an acid sanitize, a rinse recovery, a chemical recovery, and a sterilization such that the presented portions of the first and second sets of CIP data comprise CIP process data regarding the at least one common CIP phase;

wherein the first and second sets of CIP process data comprise (i) the amount or cost of at least one consumable consumed in the at least one common CIP phase and (ii) the total cost of the at least one common CIP phase;

wherein displaying the first set of CIP process data and the second set of CIP process data further comprises displaying a difference in total cost of the at least one common CIP phase between the first and second CIP wash processes;

wherein the CIP database is remote from the CIP controller and in communication via a network with the CIP controller; and wherein the CIP database includes a respective price associated with each consumable consumed in the CIP process.

3. The system of claim 2, wherein the at least one consumable consumed in the CIP phase is selected from the group consisting of electrical energy, thermal energy, water, chemistry, and time.

4. The system of claim 2, further comprising:
   a second chemistry in fluid communication with the input of the CIP object, wherein the second chemistry is different than the first chemistry, and wherein the CIP controller is configured to control fluid communication between the second chemistry and the input of the CIP object.

5. The system of claim 4, a first phase of the first CIP wash process includes fluid communication between the first chemistry and the input of the CIP object, and wherein a second phase of the first CIP wash process includes fluid communication between the second chemistry and the input of the CIP object.

6. The system of claim 4, wherein a first phase of the first CIP wash process includes fluid communication between the first chemistry and the input of the CIP object as well as fluid communication between the second chemistry and the input of the CIP object.

7. The system of claim 2, wherein the at least one common CIP phase includes use of the first chemistry, and wherein the first chemistry is selected from the group consisting of an alkaline and an acid.

8. The method of claim 1, wherein associating a respective price with each consumable consumed in the CIP process includes receiving a present cost of at least one consumable consumed in the CIP process from a remote database via a network connection between the remote database and one of the one or more programmable processors.

9. The method of claim 1, wherein receiving a proposed adjustment to a CIP phase of the CIP process includes changing an amount of a consumable used in the CIP phase.

10. The method of claim 1, wherein the at least one consumable consumed in the at least one common CIP phase is selected from the group consisting of electrical energy, thermal energy, water, chemistry, and time.

11. The system of claim 2, wherein associating the price with each consumable consumed in the CIP process includes receiving a present cost of at least one consumable consumed in the CIP process from a remote database via a network connection between the remote database and one of the one or more programmable processors.

12. The system of claim 2, wherein receiving a proposed adjustment to a CIP phase of the CIP process includes changing an amount of a consumable used in the CIP phase.

* * * * *

UNITED STATES PATENT AND TRADEMARK OFFICE
CERTIFICATE OF CORRECTION

PATENT NO. : 10,315,235 B2  
APPLICATION NO. : 14/818015  
DATED : June 11, 2019  
INVENTOR(S) : Joseph P. Curran et al.

Page 1 of 1

It is certified that error appears in the above-identified patent and that said Letters Patent is hereby corrected as shown below:

On the Title Page

Column 2; Item (74) Attorney, Agent, or Firm; Line 1; Delete "Fredrickson" and insert -- Fredrikson --

Signed and Sealed this  
Twenty-seventh Day of August, 2019

Andrei Iancu  
*Director of the United States Patent and Trademark Office*